United States Patent [19]

Fussell

[11] 4,023,071

[45] May 10, 1977

[54] TRANSIENT AND SURGE PROTECTION APPARATUS

[76] Inventor: Gerald W. Fussell, 5810 S. Ridgeway Drive, Orlando, Fla. 32805

[22] Filed: June 9, 1975

[21] Appl. No.: 584,742

[52] U.S. Cl. .................................. 361/56; 361/91; 361/89; 361/111; 361/118; 361/120
[51] Int. Cl.² ......................................... H02H 3/20
[58] Field of Search ............... 317/16, 61, 31, 61.5, 317/50, 49; 179/184

[56] References Cited

UNITED STATES PATENTS

| 3,353,066 | 11/1967 | De Souza | 317/16 X |
| 3,423,636 | 1/1969 | Rowley, Jr. | 317/16 X |
| 3,452,252 | 6/1969 | Mapham | 317/16 |
| 3,480,832 | 11/1969 | Person | 317/16 |
| 3,558,830 | 1/1971 | Bender | 317/16 X |
| 3,693,053 | 9/1972 | Anderson | 317/61 X |
| 3,737,725 | 6/1973 | Donnelly | 317/16 |
| 3,883,782 | 5/1975 | Beckwith | 317/16 |
| 3,890,543 | 6/1975 | Jonassen | 317/16 |
| 3,894,274 | 7/1975 | Rosenberry | 317/16 X |
| 3,934,175 | 1/1976 | Clark | 317/16 |

OTHER PUBLICATIONS

"Circuit, Protectors"-MCG, Electronics Inc., Application Note 749, 1974.

Primary Examiner—J D Miller
Assistant Examiner—Patrick R. Salce
Attorney, Agent, or Firm—Macdonald J. Wiggins

[57] ABSTRACT

Apparatus is disclosed for absorbing and dissipating the electrical energy present in voltage transients and surges occurring in a power distribution system for protecting the system and equipment connected thereto from damage due to such transients and surges. First bilateral nonlinear semiconductors having zener-type voltage breakdown characteristics and capability of essentially instantaneous breakdown for inputs exceeding a selected voltage breakdown are connected in parallel with the circuits to be protected. Such semiconductors have low energy-dissipating capability; therefore, second bilateral nonlinear semiconductors having much greater energy-dissipating capability, similar voltage breakdown characteristics, and slower response time are connected in parallel with the first semiconductors. The breakdown of the second semiconductors occurs in time to prevent the first semiconductors from being damaged from excessive dissipation. A gaseous discharge gap-type arrestor is connected essentially in parallel with the first and second semiconductors and has a selected striking voltage appropriate to the breakdown voltages of the semiconductors. Upon firing of the arrestor, the voltage is dropped to a very low value and the remaining surge energy is dissipated in the arrestor. Firing of the arrestor occurs after the breakdown of the second semiconductor in time to prevent the dissipation capability of the second semiconductor from being exceeded.

The cooperative and consecutive breakdown of the three elements serves to limit the peak voltage of a surge to a safe value and dissipate the surge energy without damage to the elements, thereby preventing damage to the power distribution system and associated equipments.

11 Claims, 9 Drawing Figures

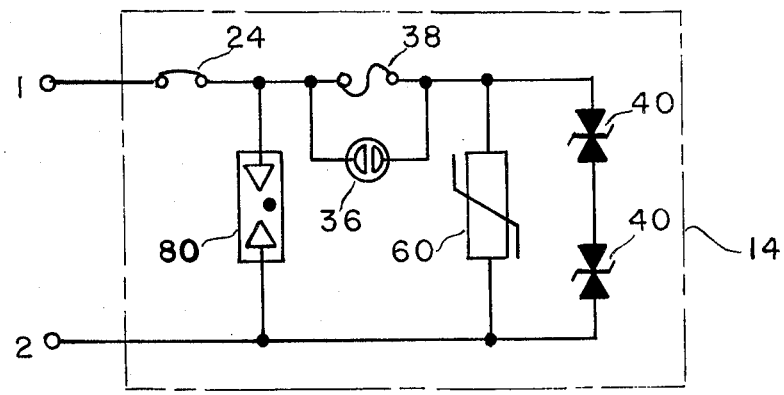
FIG. 7
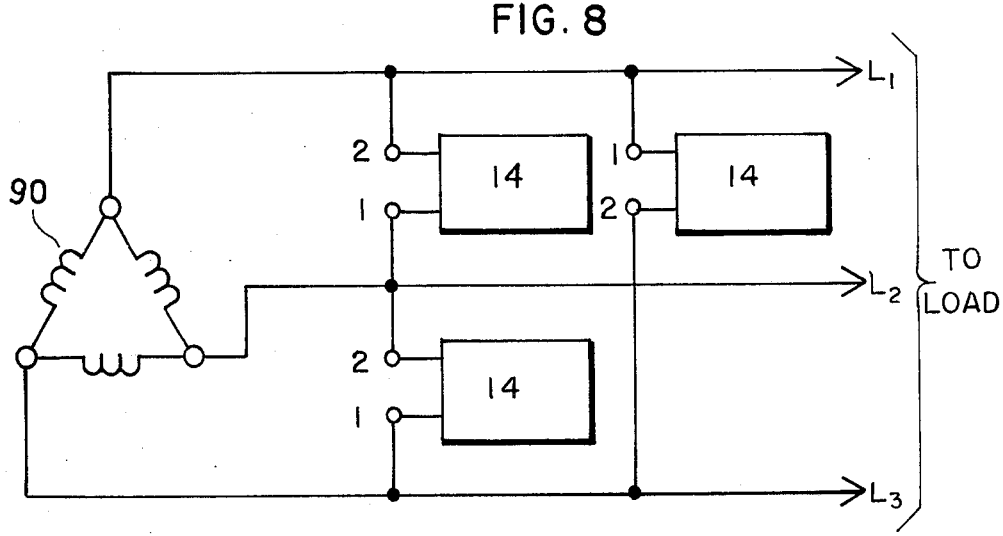
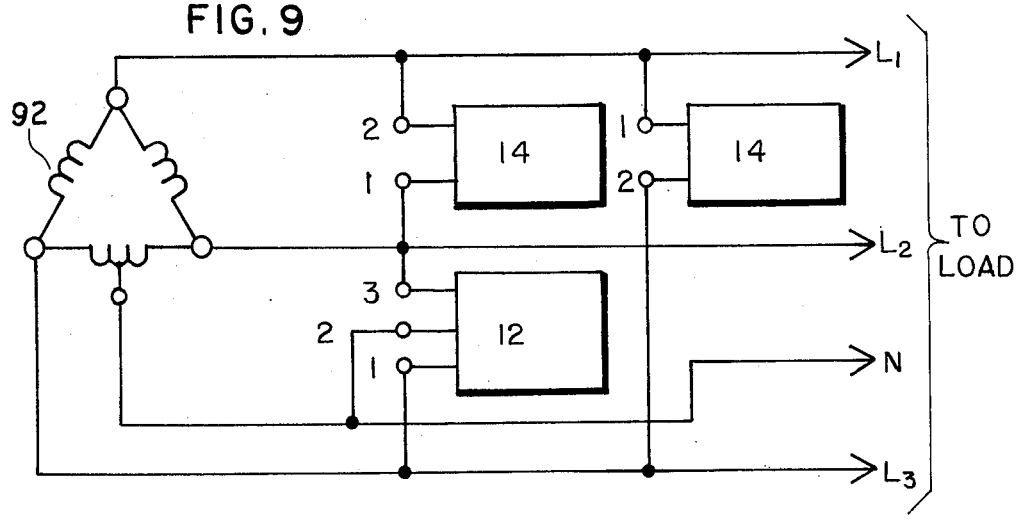

TRANSIENT AND SURGE PROTECTION APPARATUS

BACKGROUND OF THE INVENTION

1. Field of the Invention

This invention relates to apparatus for protecting residential and industrial electrical power installations from damage due to transients and surges that greatly exceed the maximum instantaneous line voltage. Such transients and surges can result from lightning, from switching occurring in the utility network, and from switching of inductive loads in the installations.

Low energy transients often have very fast rise times and peak voltages of 10,000 volts and higher. Even though the energy is low, the high voltages can damage common household equipment using low-level transistors, such as calculators, radios, and the like, and industrial equipment such as computers, instruments, and controls. Higher energy transients may involve energy as high as 100 joules and surge currents to 20,000 amperes. Inductive loads, such as motors and transformers, can experience buildup of high instantaneous voltages across the first few turns of their windings from such transients. Resultant arcing across the turns damages the insulation, resulting in shorting out of the turns. Even though failure may not be immediate, the decreased back emf causes increased power drain and overheating of the windings. Such effects are often progressive, resulting in the ultimate failure of the motor or transformer.

A major manufacturer of appliance motors has analyzed many failures and has determined that over 75% were directly or indirectly caused by transients or overvoltage surges. Motors can be designed to withstand surges; however, the extra cost is too great for the consumer appliance market.

Power and communications utilities fully recognize these problems and invest heavily in protection of their own equipment. However, most homeowners and many other power users are not aware of the transient and surge problem, and therefore accept a few years' life for motors and equipment, whereas these units should last indefinitely.

2. Description of the Prior Art

A wide variety of devices, filters, and techniques have been developed for protection of power lines, communication lines, motors, transformers, and electronic equipments from the damaging effects of transients and surges. A common approach for protection from high energy lightning transients is the use of spark gap devices such as gas discharge arrestor devices, spark gaps, and carbon blocks. While effective in shunting high currents to ground, these units have a relatively slow reaction time. Thus, fast rise time transients can reach dangerously high voltages before breakdown of the device occurs.

Zener-type semiconductor devices are available for protection against fast rise time transients; however, only small amounts of energy can be handled and these devices are easily damaged. Recently, metallic oxide varistors have been developed that can handle larger amounts of energy than the zener-type device, but the normal delay in breakdown is still excessive for high rise time transients.

In the manufacture of high-quality electronic and computer equipments, surge and transient filters are commonly built in. In most cases, filters are in series with the load, and must carry the full load current. Failures of such filters, therefore, would interrupt operation of the equipment.

No known prior art has been found that is suitable for protecting a home or building from damage from all types of transients and surges present on power lines, and that will not interrupt the power service upon failure.

SUMMARY OF THE INVENTION

In accordance with my invention, I have advantageously combined several prior art transient protection devices to operate cooperatively to absorb and dissipate the major portion of the energy contained in all types of transients and surges normally encountered on power lines. My new apparatus can be conveniently installed in parallel with the electrical service entrance for a building, and is easily removed for service without interrupting the power flow.

I have discovered useful differences in the physical and electrical characteristics of zener-type semiconductor devices, metallic oxide varistors, and gas discharge arrestors, that allow these units to operate cooperatively and thereby overcome the individual disadvantages of each. For example, a back-to-back zener unit will conduct in times as short as $10^{-12}$ seconds, and can handle 1,500 watts peak power for one microsecond at 25° C or approximately 1.5 joules. The metallic oxide varistor consisting of back-to-back semiconductor junctions can dissipate 20 to 40 joules and will react in about 50 nanoseconds.

Advantageously, I utilize zener-type bilateral devices having a breakdown voltage higher than the peak voltage of the power line to be protected and a metallic oxide varistor device having a breakdown voltage slightly less than that of the zener-type device but greater than the peak power line voltage, and have connected these two units essentially in parallel. By then connecting these two components in parallel across a power line, a fast rise time transient will tend to be clamped at the zener-type device breakdown voltage within about $10^{-12}$ seconds. About 50 nanoseconds later, the metallic oxide varistor will break down and tend to clamp the voltage at a lower value, thereby limiting the energy dissipation required of the zener-type device.

When a transient shorter than about 1 $\mu$sec subsides below the metal oxide varistor clamping voltage, this device recovers returning the system to normal and in accordance with my invention thereby limiting the overvoltage to a safe value without shorting the line currents and with no interruption of the load.

In case of a longer-lasting high energy surge such as may occur from power network switch activity, line faults, and long lightning transients, I further provide a gas discharge-type arrestor across the line to work cooperatively with the zener and varistor devices. This device will fire when its ignition voltage is reached; however, the firing requires about 1 microsecond delay. When conducting, it presents a very low impedance, acting effectively as a direct short circuit of the power line and clamping the line voltage to about 30 volts. The ionized gas will continue to conduct even after the transient has dissipated due to the line voltage. As the line voltage drops below the gas keep-alive voltage, the gas will deionize, returning the device to its quiescent state. The zener and varistor devices will, of course, recover at the instant the arrestor fires.

As may be understood, my novel transient and surge suppressor may be connected across single phase lines to neutral or ground, or can be connected across the phases of multiphase power systems. To disconnect the apparatus from the line in case of a device failure, I provide both fusing and circuit breakers.

Therefore, it is a primary object of my invention to provide apparatus to protect an electrical power system from damages due to high rise time transients and momentary voltage surges.

It is another object of my invention to protect an electrical power system from damages due to either high-energy or low-energy transients on the power lines.

It is still another object of my invention to provide apparatus that will clamp line overvoltage conditions to a safe level that will not damage electrical equipment operating from the line.

It is yet another object of my invention to provide surge protection apparatus that will react within $1 \times 10^{-12}$ seconds.

It is a further object of my invention to protect for voltage disturbances having energy up to 40 joules and peak currents of up to 20,000 amperes.

It is yet a further object of my invention to provide self-protection to automatically disconnect failed elements from the power line.

These and additional objects, features, and advantages of my invention will be apparent from the detailed description herein below.

BRIEF DESCRIPTION OF THE DRAWINGS

FIG. 7 is a schematic diagram of an alternative embodiment of my protective apparatus for a 240-volt ac electrical power installation, FIG. 8 is a block diagram of the apparatus shown in FIG. 7 connected to protect a three-phase delta connected electrical power system, and FIG. 9 is a schematic diagram of an alternative embodiment of my protective apparatus arranged to protect a so-called split-phase electrical power installation.

DESCRIPTION OF THE PREFERRED EMBODIMENTS

Figure 1:
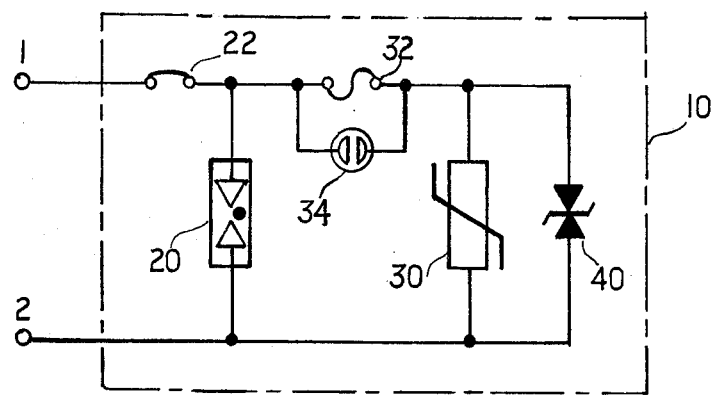
FIG. 1 is a schematic diagram of a preferred embodiment of my multiple-transient protective apparatus for application to a single-phase, 120-volt ac electrical power installation.

Referring to FIG. 1, the basic elements of my invention are shown as protective apparatus 10 applied to an embodiment to protect a single-phase electrical power installation. For purposes of example, I assume a 120-volt, 60-cycle input between terminals 1 and 2. A two-electrode gas-filled surge arrestor 20 is connected across the 120-volt line as shown. This element may be a Type TII-18/101 surge arrestor manufactured by Telecommunications Industries, Inc. The striking or breakdown voltage of arrestor 20 must be greater than the peak ac line voltage which, for this example, is approximately 170 volts. A desirable value may therefore be 200 volts. As may be recognized, a transient voltage appearing across the 120-volt line will cause the instantaneous line voltage to exceed 200 volts and strike a gaseous discharge in arrestor 20. As will be described in more detail hereinafter, the discharge will result in an arc dropping the voltage across the line to about 30 volts, thereby absorbing a major portion of the energy in the transient disturbance.

It is pertinent at this point to describe certain characteristics of the arrestor 20. The selected unit will conduct 15 transient pulses at 3-minute intervals having currents of 20,000 amperes where the waveform is assumed to rise to its peak voltage in 8 μsec and decay to one-half peak voltage in 20 μsec. This waveform has been used as a standard reference in the art, and is known as an 8/20 waveform. The unit will conduct a power line current when fired of 20 amperes for one second, ten times at 3-minute intervals. A critical characteristic of any gas discharge arrestor is the inherent delay in its firing. For the selected unit, a voltage step of 800 volts with a rise time of less than 0.05 μsec will strike the gaseous discharge in a maximum delay time of 1 μsec.

For electrical distribution systems having voltage-sensitive devices installed, the delay in firing of arrestor 20 can allow dangerously high voltages to be reached before protection can be provided. To protect the system during this initial arrestor firing delay period, I have found that two nonlinear, bilateral semiconductor elements can be used in combination with arrestor 20. To this end, I have provided metallic oxide varistor 30 and zener-type silicon device 40.

For zener-type device 40, I prefer a TransZorb TM Type No. 1.5KE200CA, manufactured by General Semiconductor Industries, Inc., and will be referred to hereinafter by its registered trademark name as a TransZorb device. Devices with identical characteristics are also available from TRW Company. These units will appear as an open circuit at voltages below the breakdown voltage and as a very low impedance at voltages above the breakdown voltage. Device 40 for use with the exemplary 120-volt line application has a breakdown voltage of approximately 200 volts. Of key importance to my invention is its characteristic of conducting within $10^{-12}$ seconds of application of its breakdown voltage. Advantageously, this characteristic positively prevents physically-realizable transients on power lines protected in accordance with my invention from reaching potentially-damaging levels before being clamped by the TransZorb device 40. The unit is capable of 1,500 watts of peak pulse power dissipation at 25° C, a forward surge current of 200 amperes, and will dissipate 1.5 joules at 75° C.

It may be understood that, while TransZorb device 40 can clamp a fast-rise time, high-energy transient essentially instantaneously, the energy contained therein may well exceed the 1.5 joule dissipation capability of device 40 during the 1 μsec before arrestor 20 fires. For this reason, I provide metallic oxide varistor 30 connected in parallel with TransZorb device 40. For the example of FIG. 1, I prefer a metallic oxide varistor Model No. V130LA20B, manufactured by General Electric. Varistor 30 is a pair of voltage-dependent, symmetrical resistors that operate in a manner similar to a back-to-back zener diode, such as the TransZorb device 40. Varistor 30 impedance will change from very high to very low when its breakdown voltage is exceeded. The specified model varistor has a breakdown voltage of approximately 190 volts, and will dissipate up to 20 joules of energy at a peak current of 2,000 amperes.

The response time of varistor 30 is a maximum of $50 \times 10^{-12}$ seconds. As may now be seen, after a fast rise time transient has caused TransZorb device 40 to break down at approximately 200 volts within one nanosecond, varistor 30 will be above its breakdown voltage and will advantageously conduct within 50 nanoseconds, thus absorbing sufficient energy to prevent damage to TransZorb device 30. Within 1 $\mu$sec, arrestor 20 will fire and dissipate the remainder of the energy in the transient, thus limiting the energy dissipated in varistor 30 to a safe value. Significantly, this unique combination of elements in my invention provide, progressively in time, means for absorbing the energy in both the fast rise time portions of a transient and the slower decay time with full protection to the elements against damage from the transient.

In addition to these main elements of my protective apparatus, I advantageously provide other protective elements for fail-safe operation thereof. As may be noted in FIG. 1, a "Slo-Blo" fuse 32 is disposed in the line between arrestor 20 and the devices 30 and 40. In case of a heavy line fault current, fuse 32 will protect the devices from damage. Similarly, failure of device 30 or 40 in a ahort-circuit mode will blow fuse 32, isolating the faulty device from the line. Indicator lamp 34, which may be a neon type across fuse 32, will light when its associated fuse is open. Neon lamp 34 can be monitored as desired to indicate that the apparatus has not failed. An alternative indicator lamp that will fail-safe may be utilized with my invention by connecting a 120-volt neon bulb in parallel with devices 30 and 40. Under normal conditions, this lamp will glow. If fuse 32 is blown for any reason, the lamp will be out, alerting the user. For industrial installations, either connection of indicator lamp 34 can be used, with lamp 34 remotely located at a power panel or other convenient point.

Thermal circuit breaker 22 is placed in the 120-volt line ahead of arrestor 20. Breaker 22 may be of the automatic resetting type. In the event that the gas in arrestor 20 fails to deionize after disappearance of a transient for any reason, breaker 22 will open, ensuring deionization.

While I have described this embodiment of my apparatus for application to a 120-volt, 60-cycle line, it is to be understood that it may be used with any voltage or frequency with appropriate changes in the operating characteristics of the various elements thereof.

Figure 2:
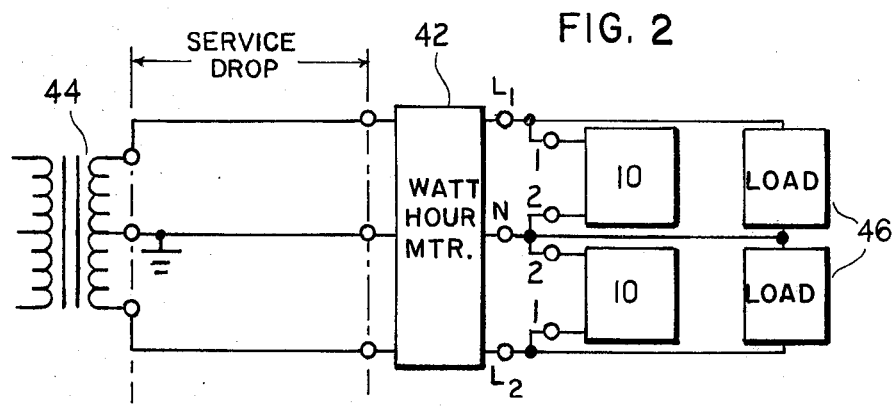
FIG. 2 is a block diagram illustrating the connection of the apparatus of FIG. 1 to a typical single-phase, 3-wire common neutral electrical power installation.

Turning now to FIG. 2, I have shown in block diagram form how the implementation of FIG. 1 can be connected to a 3-wire, single-phase common neutral power system. Line transformer 44 furnishes power to the service drop leading to watt hour meter 42 at the building. Protective apparatus 10 is connected on the load side of meter 42 in parallel with each building load 46, with terminal 1 of each apparatus 10 connected to high sides of lines L1 and L2 and terminal 2 to the neutral terminal N.

Figure 3:
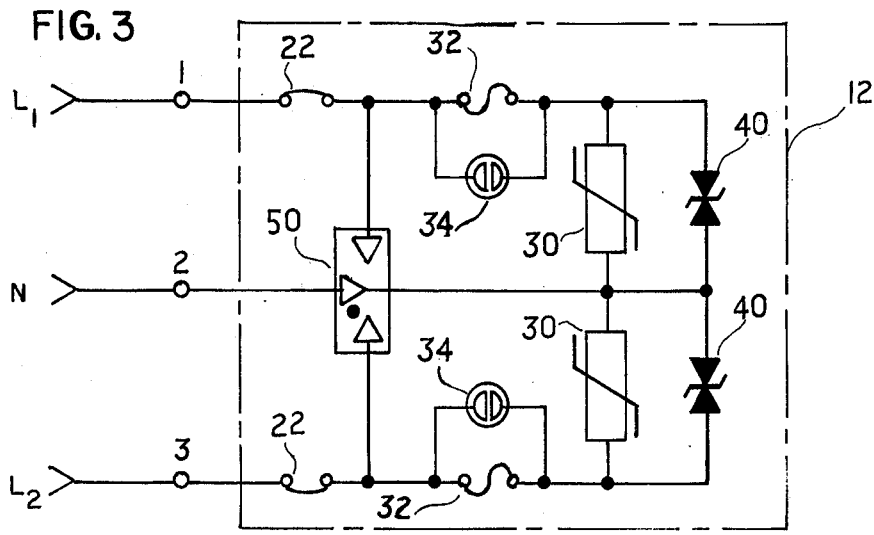
FIG. 3 is a schematic of my protective apparatus using a three-electrode arrestor.

While FIG. 2 illustrates a practical use of my protective apparatus 10 shown in FIG. 1 applied to a 3-wire, common neutral single-phase electrical system, I prefer a modified implementation for this application. FIG. 3 shows my preferred embodiment for this case. As may be noted, I have substituted three-electrode arrestor 50 for the two two-electrode arrestors 20 shown in FIG. 2. The disadvantage of the two-arrestor arrangement is that a transient arriving on line L1 and line L2 simultaneously may result in the two separate arrestors firing at slightly different times, since the exact firing times are subject to statistical variations. For the period of time when one arrestor has fired and the other has not, a voltage known as a transverse voltage will appear across the unfired arrestor and full protection would not be achieved. Advantageously, an important feature of the three-electrode arrestor 50 is that striking one set of gaps causes the other two gaps to fire virtually simultaneously. I prefer a Type TII-316(A) surge arrestor, manufactured by Telecommunications Industries, Inc., for arrestor 50. The remainder of the elements in FIG. 3 are the same as indicated in FIG. 1.

Figure 4:
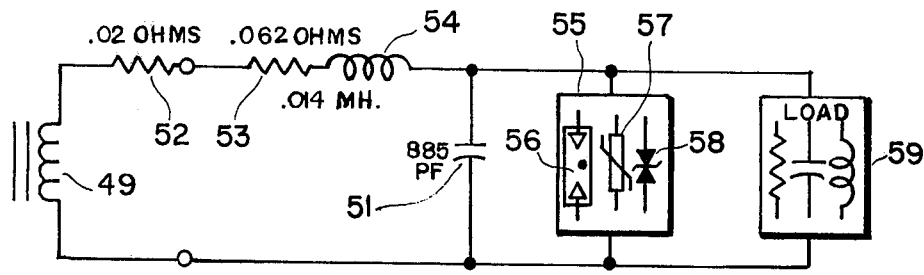
FIG. 4 is a typical approximate-equivalent circuit diagram of an installation of the type shown in FIG. 2.

Transients originating on the power lines may be due to lightning and to switching of equipment by the power company. In either event, the transient may be considered to enter the protected power system at the line transformer 44 of FIG. 2. In FIG. 4, I have shown a simplified equivalent circuit of a protected power system with the line transformer being represented by secondary circuit equivalent 49. For illustrative purposes, the secondary circuit is assumed to have a series resistance 52 of 0.02 ohms. The service drop is assumed to have a series resistance 53 of 0.062 ohms, an inductance 54 of 0.014 mh, and a shunt capacitance 51 of 885 pf, which is typical for household systems. My protective apparatus is represented by arrestor 56, varistor 57, and TransZorb device 58. As may be noted, the rise times of transients appearing across protective apparatus 55 will be limited due to the filtering effects of the R, L, and C of the systems. For the typical values shown, the series and shunt reactances will be approximately equal at 1.5 MHz, and most of the transient energy at frequencies above this value will be dissipated in the line and circuit resistances ahead of protective device 55. Therefore, the ability of TransZorb device 58 to clamp within 1 nanosecond ensures that minimal transient energy will appear in system load 59.

Figure 5:
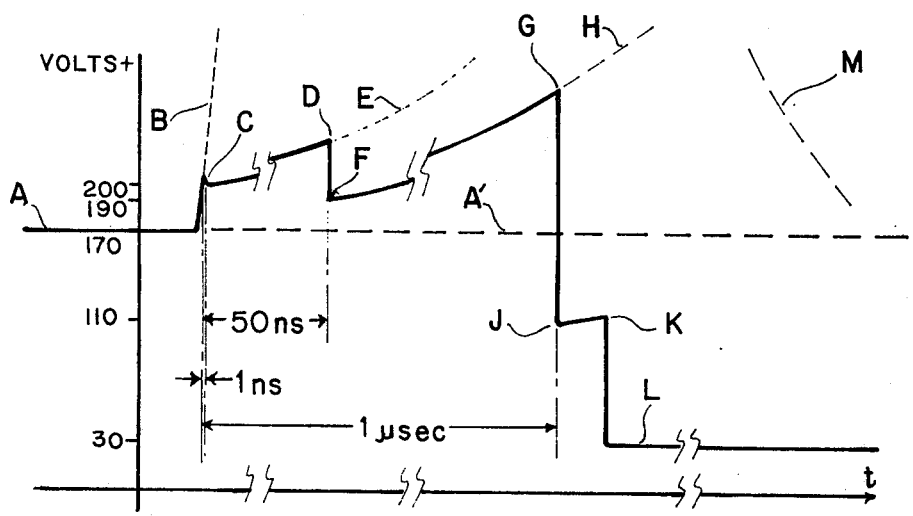
FIG. 5 is a waveform diagram, not-to-scale, illustrating the cooperative operation of the elements of my protective apparatus during the duration of an idealized high-level electrical transient.
Figure 6:
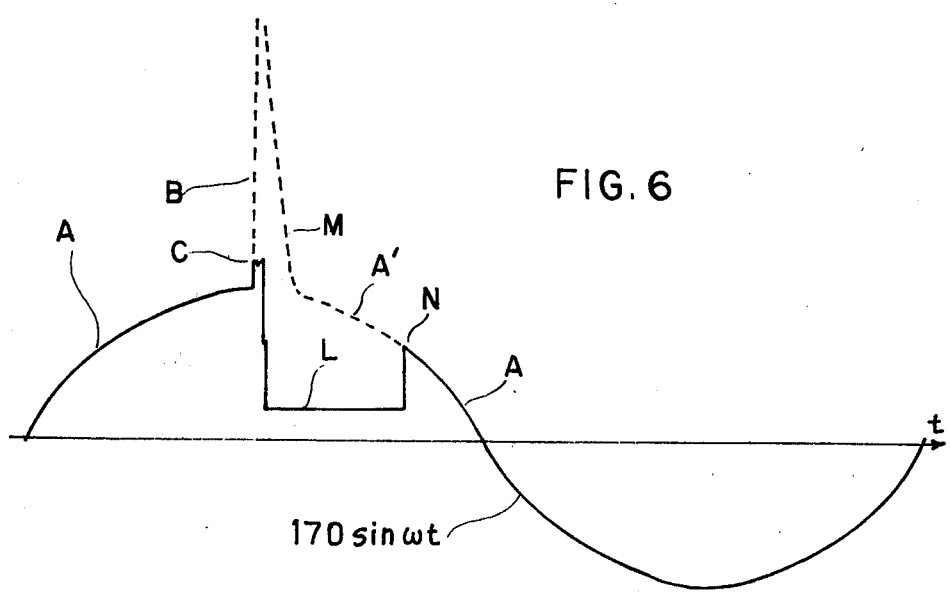
FIG. 6 is a waveform diagram, not-to-scale, of one cycle of the power line voltage during the transient shown in FIG. 5.

In FIG. 5 and FIG. 6, idealized waveform sketches showing the actions of the elements of my invention may be seen. Due to the wide excursions of the transient voltages and delay times, it is not feasible to show the waveforms to scale; however, pertinent actions are indicated by the lettered points. It is also to be understood that values shown are typical. Assume for illustrative purposes that a voltage wave A, A' for a 120-volt power line experiences a high-energy, fast rise time positive going transient B at the maximum value of its positive cycle of approximately 170 volts. Due to the extremely short time scale of FIG. 5, sinewave A appears as a constant value. Transient B added to voltage A reaches 200 volts at point C. One nanosecond later, TransZorb device 40 (FIG. 1) conducts, tending to clamp the transient at 200 volts. However, due to the finite impedance of TransZorb device 40 when conducting, the voltage across the device will tend to rise as the transient B voltage increases. This rise of voltage across device 40 will continue to point D 50 nanoseconds later. Varistor 30 is selected to conduct at 190 volts, and will break down approximately 50 nanoseconds after this voltage appears across its terminals as indicated at point D, dropping the voltage to about 190 volts at point F. In accordance with my invention, it is of importance to note that the voltage across TransZorb device 40 would increase as shown by dashed line E if varistor 30 were not present. In such case, the safe dissipation characteristic of device 40 would be exceeded, causing failure of the device. As may now be recognized, varistor 30 advantageously conducts at point D well before the level at which TransZorb device 40 would be damaged. As transient B continues to rise, the voltage across varistor 30 rises from point F to point G. As shown by dashed line H, this voltage, if allowed, would continue to rise to the point where the dissipation of varistor 30 would be exceeded and damage to varistor 30 would occur.

However, the voltage across arrestor 20 has been above its 200-volt firing point since the time represented by point C, and therefore fires at about 1 $\mu$sec at point G, in accordance with its characteristics. When arrestor 20 fires at G, a glow discharge occurs, dropping the voltage to about 110 volts at J. An arc then occurs at K, now dropping the voltage to about 30 volts at L. It is to be particularly pointed out that the dropping of the voltage across arrestor 20 to about 110 volts causes varistor 30 and TransZorb device 40 to both be below their breakdown voltages. Therefore, both devices recover and will, in accordance with my invention, not be required to dissipate any additional energy from the transient and are therefore fully-protected from damage. When the trailing edge M of the transient falls to zero, arrestor 20 will continue to conduct line current until the line voltage drops to the glow voltage at N (FIG. 6), allowing the gas to deionize and returning the circuit to normal. FIG. 6, while not to scale, shows the approximate relationships of the various parts of the waveform just described. It is to be noted that the dashed lines represent the waveforms in the absence of my protective apparatus. It is also to be understood that the nonlinear elements of my apparatus are bilateral and a negative-going transient will be similarly clamped.

Another embodiment of my transient protective apparatus 14 is shown in FIG. 7 and is applicable to 240-volt power systems. The parallel combination of arrestor 80, varistor 60, and zener-type devices 40 is connected across the 240-volt line. Arrestor 80 may be a Type TII-18/101C, varistor 60 may be a GE Type V250LA40A, and device 40 may be a General Semiconductor TransZorb Type 1.5KE200CA. As may be noted, two of the TransZorb devices 40 are connected in series to be operative with the higher voltage. Thermal circuit breaker 24 and Slo-Blo fuse 38 is in series with devices 60 and 40 for protection of the apparatus in the same manner as the embodiment of FIG. 1, described herein above.

FIG. 8 illustrates the use of my protective apparatus 14 as applied to a 240-volt, 3-phase delta connected power system. An apparatus 14 is connected across each phase of delta connected 3-phase transformer secondary 90 as shown.

An application of my invention to a 240-volt, 3-phase delta power system, with a split phase supplying single-phase, 3-wire, 120-volt common neutral, is shown in FIG. 9. As may be noted, phase L2–L3 is the split phase of transformer secondary 92, and the apparatus 12 shown in FIG. 3 is connected in parallel with lines L2, L3, and N. The remaining two phases L1–L2 and L1–L3 are protected with apparatus 14 arranged as described above in reference to FIG. 8. As may now be recognized by those skilled in the art, any type of electric power system, such as: 3-phase, 3-wire; 3-phase, 4-wire; and 2-phase can be protected by obvious arrangements of the basic elements of my invention.

My transient protective apparatus is applicable to any type of installation, from a small private residence to large industrial complexes. For large installations, the apparatus should be installed at the service entrance, and additional apparatus installed at strategic points in the system to protect against lightning-induced transients in the building wiring and against surges from inductive devices.

While I have specified certain specific elements to be used in my apparatus, many equivalent devices available from other vendors may be substituted, provided the voltage breakdown, dissipation, and operating time delays are appropriate. As will be recognized by those skilled in the art, my protective device is also applicable to direct current power systems, and many variations are obvious without departing from the spirit of my invention.

I claim:

1. Apparatus for protecting electrical power systems and equipment connected thereto from damage due to voltage transients and surges that exceed the maximum instantaneous peak voltages of the systems, comprising:
    first electrical energy-dissipation means having a first breakdown voltage slightly greater than the maximum instantaneous peak voltage, said first means responsive essentially instantaneously to a voltage surge exceeding such first breakdown voltage, to dissipate a first portion of energy contained in such surge;
    second electrical energy-dissipation means having a selected second breakdown voltage slightly less than said first breakdown voltage of said first means, said second means responsive after a selected first delay period to such voltage surge to dissipate a second portion of energy contained in such surge, causing the voltage across said first means to drop below said first breakdown voltage whereby said first means ceases to dissipate energy with said first delay period selected to limit the energy-dissipation in said first means to a value within the dissipation capability of said first means, said second means being electrically connected to said first means;
    third electrical energy-dissipation means having a selected third breakdown voltage essentially equal to said first breakdown voltage, said third means responsive after a selected second delay period to such voltage surge to dissipate the remaining energy contained in such surge, causing the voltage across said second means to drop below said second breakdown voltage whereby said second means ceases to dissipate energy with said second delay period selected to limit the energy dissipated in said second means to a value within the dissipation capability of said second means, said third means being electrically connected to said second means; and
    wherein said first, second, and third electrical energy-dissipating means are electrically connected to an electrical power system whereby said first, second, and third means cooperate to dissipate the energy of said voltage surge without damage to said first and second means thereby preventing such voltage surge from exceeding a value slightly greater than the maximum instantaneous peak voltage of such power system.

2. The apparatus as defined in claim 1 in which said first, second, and third electrical energy-dissipating means are electrically connected essentially in parallel with a single-phase ac electrical power system.

3. The apparatus as defined in claim 1 in which a plurality of said first, second, and third electrical energy-dissipating means are electrically connected essentially in parallel with each phase of a multiphase ac electrical power system.

4. The apparatus as defined in claim 1 in which:
the response of said first electrical energy-dissipation means to such surge occurs within approximately one nanosecond after the voltage of such surge exceeds said first breakdown voltage;
said selected first delay period is approximately fifty nanoseconds; and
said selected second delay period is approximately one microsecond.

5. The apparatus as defined in claim 1 in which:
said first electrical energy-dissipation means includes at least one bilateral nonlinear semiconductor device;
said second electrical energy-dissipation means includes at least one bilateral varistor wherein breakdown of said varistor causes a small drop in system voltage to a value resulting in recovery of said first means from its breakdown state; and
said third electrical energy-dissipation means includes at least one gaseous means in which breakdown of said gaseous discharge means causes a drop in system voltage to a relatively low value resulting in recovery of said second means from its breakdown state and said gaseous discharge means recovers from its breakdown state shortly after cessation of such surge.

6. The apparatus as defined in claim 5 in which:
said bilateral nonlinear semiconductor device is responsive to such voltage surge within approximately one nanosecond after the voltage of such surge exceeds said first breakdown voltage;
said bilateral varistor is responsive to such voltage surge within approximately 50 nanoseconds after the voltage of such surge exceeds said second breakdown voltage; and
said gaseous discharge means is responsive to such final portion of such voltage surge within approximately one microsecond after the voltage of such surge exceeds said third breakdown voltage.

7. The apparatus as defined in claim 5 in which:
said bilateral nonlinear semiconductor device comprises two back-to-back zener diodes;
said bilateral varistor comprises metallic oxide voltage dependent resistors; and
said gaseous discharge means comprises two-electrode gas-filled surge arrestors.

8. The apparatus as defined in claim 5 in which:
said bilateral nonlinear semiconductor device comprises two back-to-back zener diodes;
said bilateral varistor comprises metallic oxide voltage dependent resistors; and
said gaseous discharge means comprises three-electrode gas-filled surge arrestors.

9. The apparatus as defined in claim 1 in which:
said first and second electrical energy-dissipation means include fusing means arranged to isolate said first and second energy-dissipation means from said electrical power system in the event of failure of said first or second means; and
said third electrical energy-dissipation means includes circuit breaker means arranged to isolate said third energy-dissipation means from said electrical power system in the event of failure of said third means.

10. The apparatus as defined in claim 9 in which said fusing means includes indicator means, said indicator means providing visual indication of the operating condition of said apparatus.

11. Apparatus for absorbing and dissipating electrical energy present in voltage transients and surges occurring in power distribution systems, comprising:
first bilateral nonlinear semiconductor means, said first means electrically connected essentially in parallel with an electrical circuit, and having a breakdown voltage slightly higher than the instantaneous peak voltage in said electrical circuit, said means essentially instantaneously clamping transient and surge voltages to such breakdown voltage, and dissipating energy from first portions of such transient and surge voltages;
second bilateral nonlinear semiconductor means, said second means electrically connected in parallel with said first means, and having a breakdown voltage slightly higher than the instantaneous peak voltage in said electrical circuit and slightly lower than the breakdown voltage of said first means, having a first delay in breakdown of said second means causing such breakdown to occur a short time period after the breakdown of said first means, whereby energy from second portions of such transient and surge voltages is dissipated and said first means is protected from damage from such energy in such second portions; and
gaseous discharge means, said latter means electrically connected essentially in parallel with said first and second means, and having a striking voltage slightly higher than the instantaneous peak voltage in said electrical circuit, wherein an arc occurs in said gaseous discharge means subsequent to the voltage breakdown of said second means, thereby dissipating energy from final portions of such transient and surge voltages and protecting said second means from damage from such energy in such final portions;
whereby said electrical circuit is protected from damage from such transient and surge voltages by such dissipation of electrical energy.

* * * * *